Inventors
Ernst Theunissen
Hans-Eckhard Sass
By [signature]
Attorneys

Fig. 5A — Voltage level at which the discriminators respond.

United States Patent Office 3,423,047
Patented Jan. 21, 1969

1

3,423,047
METHOD AND APPARATUS FOR THE POSITION STABILIZATION OF A FLYING BODY
Ernst Theunissen, Ottobrunn, by Munich, and Hans-Eckhard Sass, Munich, Germany, assignors to Bolkow Gesellschaft mit beschrankter Haftung, Ottobrunn, by Munich, Germany
Continuation-in-part of application Ser. No. 364,616, May 4, 1964. This application Sept. 27, 1967, Ser. No. 671,077
Claims priority, application Germany, May 9, 1963, B 71,824
U.S. Cl. 244—3.18     12 Claims
Int. Cl. F41g 7/00; F42b 15/02; G06f 15/50

ABSTRACT OF THE DISCLOSURE

A method and apparatus for stabilizing the position of a flying body, by selectively operable position restoring means, are disclosed, in which effective position stabilization or restoration can be obtained without measuring the rate of deviation. In accordance with the disclosure, control of the restoring means is made dependent upon whether the deviation occurs in only a small range or whether the deviation progresses into a larger range outside the small range. A first restoring action is initiated responsive to a deviation in the small range and, if the deviation progresses into the larger range, a second restoring action is initiated with termination of the first restoring action. In the latter case, when the deviation returns into the small range, both restoring actions are made ineffective so that the body "coasts" back to its preselected position with the restoring means deactivated.

---

This application is a continuation-in-part of our copending application Ser. No. 364,616, filed May 4, 1964, now abandoned, for "Method and Apparatus for the Position Stabilization of a Flying Body."

The apparatus includes photo element signal generators arranged along a substantially rectilinear axis, optical means arranged to direct light from a celestial body along the axis, and control circuit means connected to the signal generators. The optical means, when the flying body occupies the preselected position with respect to the celestial body, directs light on the axis outside the photo elements and, when the position of flying body deviates from the preselected position, directs light upon a selected one of the generators in accordance with the extent of the deviation.

The control circuit means includes respective amplifiers and discriminators for each of the small range and the larger range, a differentiating member associated with each amplifier and discriminator, a reversing stage associated with one differentiating member, a multi-vibrator and a gate controlled by the multi-vibrator. The amplifier and discriminator connected to the generator associated with the small range is connected to the position restoring means through the gate, whereas the other amplifier and discriminator is connected directly to the restoring means. The gate is blocked when the deviation moves back into the small range.

BACKGROUND OF THE INVENTION

It is known to stabilize the position of flying bodies with arrangements which exert constant torques on the flying bodies. Such arrangements or means may include, for example, gas nozzles, fly wheels, or other reaction devices.

In known control arrangements utilizing such restoring means exerting a constant torque, control of the restoring

2 means is effected by means measuring or sensing not only the magnitude and direction of deviation from the desired position, but also the rate of such deviation. However, the rate of deviation is usually a very small value, and measurement of the rate of angular deviation with the required exactness accordingly can be accomplished only at great expense and with great difficulty.

SUMMARY OF THE INVENTION

This invention relates to the stabilization of the position of a flying body and, more particularly, to an improved deviation-responsive control system for selectively operable position restoring means and to a novel method of effecting such stabilization.

In accordance with the present invention, it has been discovered that effective position stabilization or restoration can be attained without measuring the rate of deviation, if the control of the restoring means is made dependent upon whether the deviation occurs in only a small range or whether the deviation progresses into a larger range outside the small range. A first restoring action is initiated responsive to a deviation in the small range and, if the deviation progresses into the larger range, a second restoring action is initiated, with termination of the first restoring action. In the latter case, when the deviation returns into the small range, both restoring actions are made ineffective so that the body "coasts" back to its preselected position with the restoring means de-activated.

An object of the present invention is to provide a position stabilizing apparatus for a flying body in which position stabilization is effected in dependence only upon the magnitude and direction of deviation, and disregarding the velocity or rate of deviation.

Another object of the invention is to provide such a system in which the measured deviation may be within either one of two ranges, one a range of small deviations and the other a range of large deviations, and which system exerts a controlling effect in accordance with whether the deviation is in the small range or in the large range.

A further object of the invention is to provide a dual range deviation control system for the position stabilization of a flying body in which, if the deviation is within a relatively small range and the position can be restored from this range, a first control system is effective to restore the position, but in which, if the deviation progresses into the range of larger deviations before the restoring force begins to take effect, only the control means associated with the larger range of deviation is effective and the control means associated with the smaller range of deviation is maintained ineffective in the restoring action.

To attain the foregoing objects, the control means of the invention includes a selectively operating control circuit for position restoring means, and which includes two signal generators for each coordinate, one signal generator being associated with a relatively small range of deviation and the other signal generator being associated with a larger range of deviation outside such small range. When the deviation is within the small range, the restoring arrangement is controlled by the signal generator associated with said small range only if the preselected position or orientation can be restored without the deviation progressing into the larger range. If the deviation does progress into the larger range before the preselected position can be restored, then the signal generator associated with the larger range nullifies the control effect of the signal generator associated with the smaller range, while effecting correction or re-stabilization from the larger range through the smaller range.

In a particular embodiment of the invention selected for exemplary illustration, the control circuit includes first and second amplifiers, each of which is controlled by a respective sensing device or means associated with a particular range of deviations, and these amplifiers control the activation (on-off) of the adjusting or restoring means. Each amplifier is provided with a discriminator. The first amplifier is associated with the range of larger deviations and directly controls the adjustment or restoring means. The second amplifier, with its discriminator, controls the adjusting or restoring means through a YES-NO gate. The gate is, in turn, controlled by a bi-stable multi-vibrator. A switching or reversing pulse is applied to this multi-vibrator from the second amplifier-discriminator which is associated with the range of small deviations, and this reversal or change-over pulse is supplied to the multi-vibrator through a differentiating stage, a reversing stage and a diode. Responsive to such reversing pulse, the multi-vibrator triggers the gate to a signal passing condition. A restoring pulse is supplied to the multi-vibrator from the first amplifier, associated with the large deviation range, through a differentiation stage and a diode. Responsive to the restoring pulse, the multi-vibrator "closes" the gate.

When the gate is "open," due to the reversing pulse, the second amplifier is effective to control the "on-off" condition of the restoring means. When the gate is "closed," due to the restoring pulse, only the first amplifier is effective to control the restoring means.

In further accordance with the invention, a novel type of signal generator is provided including plural light conduction bodies having light entry surfaces and light exit surfaces. Each light exit surface has a photocell associated therewith. The light conducting bodies are arranged in a predetermined formation, and also in association with an opaque body or neutral member. When the flying body has a pre-set orientation or position, an image forming light beam is centered on the opaque member. Upon a deviation from this position, the image is shifted onto the adjacent one, or further onto an additional more remote one, of a pair of light conducting members to energize the respective photocells associated therewith to provide a control signal for the respective amplifier, one photocell being associated with each respective one of the mentioned first and second amplifiers.

For an understanding of the principles of the invention, reference is made to the following description of a typical embodiment as illustrated in the accompanying drawings.

In the drawings:

FIGS. 5A through 5E are pulse diagrams explanatory of the operation of the block diagram of the control circuit shown in FIG. 2.

DESCRIPTION OF THE PREFERRED EMBODIMENT

Figure 1:
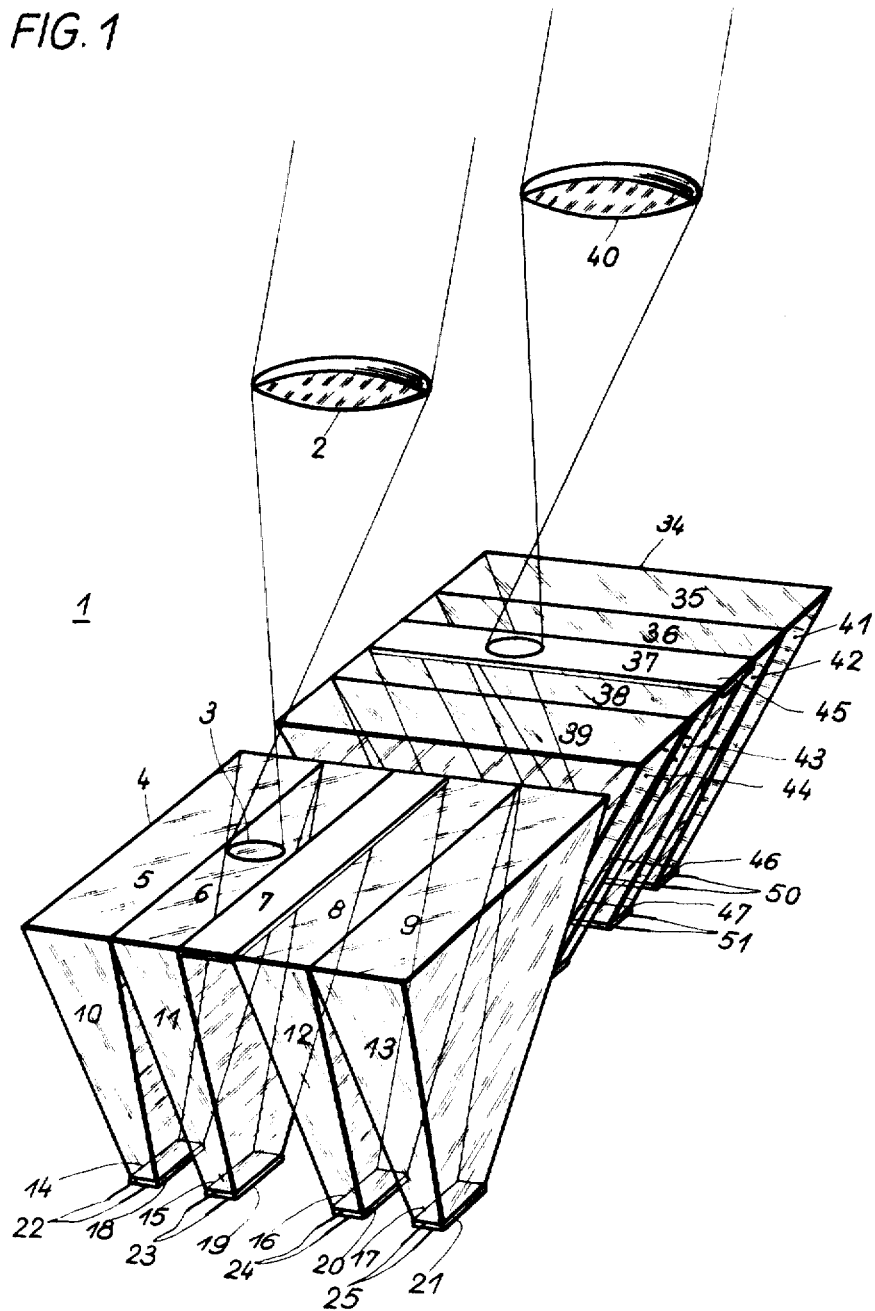
FIG. 1 is a somewhat schematic oblique projection view of a novel signal generator useable with the control system of the invention.

Referring to FIG. 1 of the drawings, a signal generator 1 is illustrated which, with the aid of an optical system 2, directs an image 3 of a celestial body onto a screen generally indicated at 4. Screen 4 is divided into plural strip-like, and preferably rectangular planar, zones 5, 6, 7, 8 and 9. Zones 5, 6, 8 and 9 are the light entry surfaces of light conducting bodies 10, 11, 12 and 13, and constitute deviation ranges from a light impermeable body 7. Photo elements, such as photocells, are positioned at the light exit surfaces 14–17 of light conducting bodies 10–13, respectively. Leads 22–25 are provided to connect the respective photo elements to an electronic control circuit described hereinafter.

Screen 4 and the optical system 2 are in fixed relation to each other, and are so mounted in the flying body. They may be adjusted, as a unit, in such a manner that, when the flying body has the desired position, an image of a celestial body is directed upon the center of picture screen 4 in the desired range indicated as 7, which is the surface of a light impermeable strip or member. Upon deviation of the image toward either the right or the left, photo elements 20 or 21, or photo elements 19 or 20, have light impinging thereupon in accordance with the direction and extent of the deviation.

Of course, for proper positioning, it is necessary to measure the deviation along at least two coordinates. For this purpose deviations in a direction perpendicular to the deviation of the image 3 along screen 4 are sensed by an additional screen 34 divided into strip-like and preferably rectangularly planar zones 35–39, each of which extends perpendicularly to the zones 5–9 associated with the image screen 4. The screen 34 is otherwise of the same or similar construction as the screen 4, and includes an optical system 40, light conducting bodies 41–44, and photo elements, of which only two, 46 and 47, are visible in FIG. 1. A light impermeable zone at the center of screen 34 is indicated at 45. The photo elements 46 and 47 may be connected with the control circuit by respective leads 50 and 51.

Position stabilization of the flying body is effected solely in dependence on the direction and magnitude of the deviations and not upon the velocity or rate of deviation. This is made possible by the described signal generator in that those photo elements which are associated with a deviation along one coordinate, such as the elements 18 and 19, for example, control an electronic control circuit in such a manner that, upon activation of a larger deviation, a restoring moment or force will always be effective. However, upon actuation of photo element 19, which is situated in the range of a smaller deviation, a restoring moment or force will be effective only if the range of larger deviation has not been traversed previously. That is, only if the deviation is one starting from the desired or pre-selected position.

Figure 2:
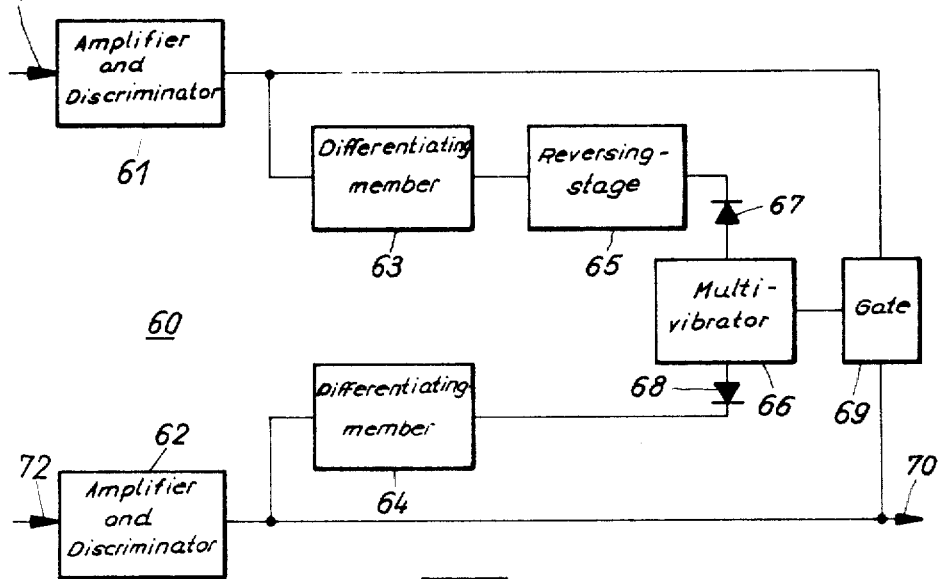
FIG. 2 is a block diagram of the control circuit.

FIG. 2 illustrates, in block form, the electronic control circuit for effecting this operation of the position restoring means. An amplifier and discriminator 61 obtains an input signal from line 71 connected to a photo element associated with the smaller range of deviation, such as, for example, the photo element 19 of FIG. 1. The photo element 19 is situated within the range of small deviations, or at the light exit end of body 11 whose light entry end 6 is adjacent and contiguous to the borders of the desired range represented by the light impervious strip 7.

A second amplifier and discriminator 62, which is essentially the same as the amplifier and discriminator 61, receives its input from a line 72 which is connected with the photo element in the range of larger deviations or outwardly of the range of smaller deviations. For example, such a photo element is the photo element 18 of FIG. 1, which is at the light exit end of body 10 whose light entry end 5 is more remote from strip 7.

The output of amplifier and discriminator 61 is connected, through a YES-NO gate, 69 with a line 70, while the output of amplifier 62 is connected directly to line 70. Line 70 leads to the on-off controls for the adjusting or restoring means, and a final amplifier may be included in line 70 in advance of the restoring or adjusting means.

Gate 69 is controlled by a bi-stable multi-vibrator 66 and is normally "closed." Multi-vibrator 66 obtains its change-over or reversing impulse from amplifier and discriminator 61 through a differentiating member 63, a reversing stage 65 and a diode 67. The restoring pulse, or the pulse in the opposite direction, is supplied from amplifier and discriminator 62 through a differentiating member 64 and a diode 68. It will be noted that diodes 67 and 68 are connected to the multi-vibrator 66 with a polarity such that these diodes will pass only negative pulses to the multi-vibrator 66.

The output signals of the photo elements 19 and 18, respectively associated with the range of smaller deviations 6 and the range of larger deviations 5, are independently supplied to the amplifiers and discriminators 61 and 62, respectively, through respective inputs 71 and 72. When an image 3 originating from a celestial body travels into the small deviation area 6 of the optical device shown in FIG. 1, the amplifier and discriminator 61, for amplifying and discriminating small deviations, receives an electrical signal over input 71. The amplified and discriminated signal at the output of amplifier and discriminator 61, as applied to differentiating member 63, is differentiated in member 63 in a manner such that the flanks yield needle-shaped impulses. Thus, the leading flank of the signal at the output of differentiating member 63 appears as a positive needle-shaped impulse, and the trailing flank of the signal appears as a negative needle-shaped impulse. The polarity of the respective needle-shaped impulses is reversed in reversing stage 65 so that the leading flank of the signal at the output of reversing stage 65 is now represented by a negative needle-shaped impulse, whereas the trailing flank of the signal at the output of reversing stage 65 is a positive needle-shaped impulse. Due to the particular polarity connection of diode 67 between reversing stage 65 and one input of multi-vibrator 66, only the negative needle-shaped impulse, representing the leading flank of the received signal, is transmitted to one input of multi-vibrator 65.

Reversing stage 65 has the function of reversing the polarity of the needle-shaped impulses arriving from differentiating member 63 so that the needle-shaped impulse corresponding to a front flank of the signal at the output of amplifier and discriminator 61 has a negative polarity when leaving the reversing stage 63 and thus can influence multi-vibrator 66 through diode 67. The feeding of the negative needle-shaped impulse to one input of multi-vibrator 66, through diode 67, brings multi-vibrator 66 into a switching state such that gate 69 becomes transmissive for the signal at the output of amplifier and discriminator 61. Thus this signal is transmitted through gate 69, in by-passing relation with differentiating member 63, reversing stage 65, diode 67 and multi-vibrator 66, to line 70, to be supplied to the final or last stage amplifier in advance of the adjusting or restoring means, to activate the adjusting or restoring means in a deviation-correcting direction.

When the image 3 travels from the area 6 of smaller deviations to the area 5 of larger deviations, and completely leaves the area 6, the signal at the output of amplifier and discriminator 61 is interrupted. The resulting rear flank of the signal appears at the output of differentiating member 63 as a negative needle-shaped impulse which is transformed, by reversing stage 65, into a positive needle-shaped impulse. Diode 67 blocks this positive needle-shaped impulse, and thus it cannot have any influence on multi-vibrator 66.

Before the image 3 completely leaves area 6, it has already entered area 5. Thus, photocell 18 coupled with area 5 provides an electrical signal to amplifier and discriminator 62. Amplifier and discriminator 62 thus provides an electric control signal directly to the output line 70 leading to the control means. This control signal, however, does not change the operating state of the control element connected to output line 70, since the latter is already activated by the signal delivered from amplifier 61 through gate 69. The signal emitted by amplifier 62 is differentiated by differentiating member 64 so that its leading flank provides a positive needle-shaped impulse at the output of differentiating member 64, and its trailing flank provides a negative needle-shaped impulse at the output of differentiating member 64. The positive needle-shaped impulse at the output of differentiator 64, and representing the leading flank of the signal at the output of amplifier and discriminators 62, cannot influence multi-vibrator 66 since it is blocked by diode 68 connected to the second input of multi-vibrator 66.

When image 3 moves outwardly beyond area 5, the photocell 18 no longer supplies a signal to amplifier and discriminator 62. The signal at the output of amplifier 62 is thus terminated, and its resulting rear flank at the output of differentiating member 64 forms a negative needle-shaped impulse. This negative needle-shaped impulse is transmitted through diode 68 to the second input of multi-vibrator 66, whereby the multi-vibrator is brought into another stable switching state and thus blocks gate 69.

When image 3 moves from area 5 into area 6, an output signal appears at the output of amplifier and discriminator 61 connected to the photocell 19 associated with the area 6. The leading flank of this output signal forms, at the output of differentiating member 63, a positive needle-shaped pulse which is reversed in polarity by reversing stage 65 so that it is applied to diode 67 as a negative needle-shaped impulse. This triggers multi-vibrator 66 to the switching state in which the multi-vibrator opens gate 69.

When image 3 moves further into area 6 and completely leaves area 5, the signal supplied to amplifier and discriminator 62 by photocell 18, associated with area 5, is interrupted. The trailing flank of the interrupted signal appearing at the output of amplifier 62 appears, at the output of differentiating member 64, as a negative needle-shaped impulse. This negative needle-shaped impulse effects, as described above, a change of the switching state of multi-vibrator 66 by virtue of being applied to the other multi-vibrator input through the diode 68. Multi-vibrator 66 is thus triggered to a state in which it blocks gate 69. Consequently, the signal at the output of amplifier and discriminator 61, during the time image 3 is traversing area 6, cannot travel through gate 69 and thus can have no influence on the control means connected with output 70. The control element means connected with output 70 is thus disconnected as soon as image 3 leaves area 5.

The mode of operation of the electronic arrangement shown in FIG. 2 is an important feature of the invention. Thus, if image 3 travels from an area representing a greater deviation, such as one of the areas 5 or 9, into an area representing a range of smaller deviations, such as one of the areas 6 or 8, or, otherwise stated, in the direction of the neutral position 7, the action of the control means is interrupted when ranges of smaller deviations are reached and thus no control orders are then supplied to the missile. The mode of operation of the control circuitry shown in FIG. 2 thus takes into account the inertia with which the missile reacts, particularly in free space, on control orders varying the respective missile or flying body position.

A pre-requisite for the mode of operation of the electronic arrangement shown in FIG. 2 is that the size of image 3 must be sufficiently large that it will appear simultaneously in both areas, as previously mentioned, when passing from one area to the other. For example, when passing from area 5 to area 6, image 3 will appear on both areas during a certain transition time. This assures that a negative needle-shaped impulse at the output of reversing stage 65, and corresponding to the beginning of travel of image 3 into area 6, always reaches multi-vibrator 66 sooner than a negative needle-shaped impulse at the output of differentiating member 64 and corresponding to the image 3 leaving the area 5.

A detailed description of the pulse sequence will now be provided with reference to FIGS. 4 and 5A through 5E. The photocells connected with areas 5 and 6 actually produce somewhat similar trapezoidal pulses when image 3 is incident upon these areas. During the passage of light beam 3 from area 5 to area 6, the current emitted by the photocell connected to area 5 actually decreases while, and simultaneously, the current emitted by the photocell connected to the area 6 gradually increases. The same conditions occur during movement of the image 3 in the reverse direction from area 6 into area 5.

As shown in FIG. 2, and as clearly pointed out above, the elements 61 and 62 are not merely amplifiers, but are amplifiers and discriminators. Such a discriminator generally acts as a current or voltage discriminator and, in its most simple form, may be a so-called "Schmitt trigger," by way of example. Thus, the trapezoidal pulses from the photocells are not only amplified in elements 61 and 62 which, in an overamplification of the amplifier as selected for the system, will already lead to a peaking of the pulse flank, but the pulses are transformed, by the discriminators, into rectangular pulses whose flanks are almost ideally vertical.

Figure 4:
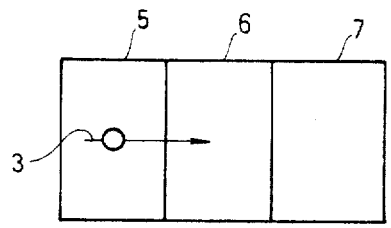
FIG. 4 is a top plan view of a portion of the signal generator shown in FIG. 1.
Figure 5B:
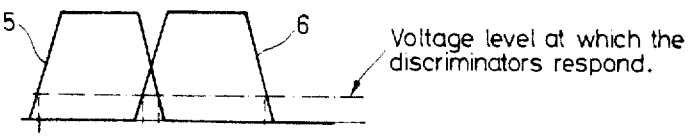
Figure 5B:
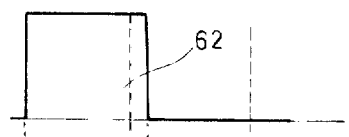

Referring to FIG. 4, this figure shows the image 3 as proceeding from the area 5 toward the area 6. FIG. 5A shows the overlapping trapezoidal outputs of the photocells associated with the areas 5 and 6. The discriminators in the elements 61 and 62 are constructed in such a manner that they will respond when the voltage reaches a certain level, which level is labeled in FIG. 5A. For example, when constructed as Schmitt triggers, such discriminators change their switching position at a certain voltage level. Depending upon the occurrence of this predetermined voltage level within the trapezoidal pulses emitted by the photocells, there thus results, at different times and in the manner shown in FIGS. 5B and 5C, rectangular pulses at the outputs of units 61 and 62.

Figure 5C:
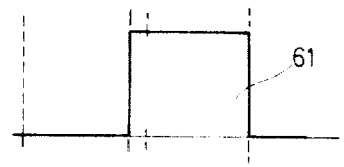
Figure 5D:
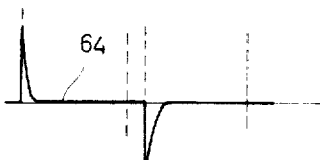
Figure 5E:
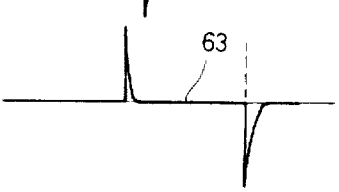

Since, however, and as clearly shown in FIG. 2, not only the trapezoidal pulses emitted by the photocells but the amost ideal rectangular pulses at the outputs of elements 61 and 62, as shown in FIGS. 5B and 5C, are differentiated by the differentiating members 64 and 63, respectively, there results, at the output of the differentiating members, needle pulses as shown at 64 and 63 in FIGS. 5D and 5E, respectively.

It will be clear from FIGS. 5A through 5E that the needle pulses occur exactly and successively in the timed order which is necessary for the manner of functioning of the multi-vibrator 66 and the gate 69, as clearly set forth above. The foregoing description clarifies the manner of operation of the invention with respect to any questions arising from the overlapping of the trapezoidal pulses shown in FIG. 5A.

For complete control, a respective electronic system must be provided for each direction of deviation from a neutral position along each of a pair of mutually perpendicular axes. Consequently, four electronic control systems are necessary for stabilizing the position, with each control system corresponding to a particular direction of deviation along a particular axis.

Figure 3:
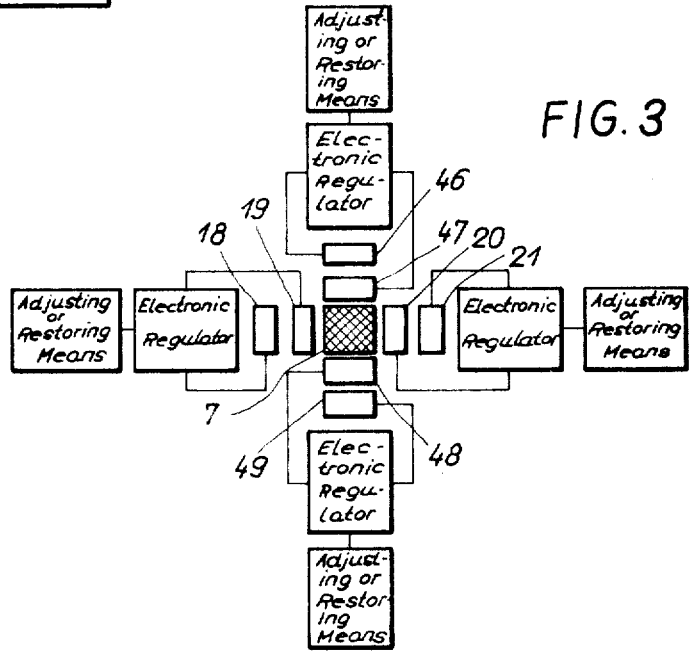
FIG. 3 is a block diagram illustrating four control circuits of the type shown in FIG. 2 and each associated with a respective positional coordinate.

FIG. 3 shows a complete system consisting of four completely independent electronic control systems. For simplicity, only the photo elements 18–21 and 46–49 of FIG. 1, are illustrated. The light impermeable element 7 is common to both sets of photo elements. Each pair of photo elements, for example, the pair 18 and 19, associated with a respective coordinate, acts upon an adjusting electronic control system of the type shown in FIG. 2 and which is designated "Electronic Regulator" in FIG. 3. Each electronic regulator is operatively associated with a respective adjusting or restoring means.

While a specific embodiment of the invention has been shown and described in detail to illustrate the application of the principles of the invention, it will be understood that the invention may be embodied without departing from such principles.

What is claimed is:

1. Apparatus for stabilizing the position of a flying body by selectively operable position restoring means, comprising, in combination, first means operable, responsive to a deviation of the body through a relatively small range from a pre-selected position, to activate the restoring means; second means operable, responsive only to deviation of the body through a relatively large range, outside said relatively small range, from a pre-selected position, to activate the restoring means; and means operable by said second means, responsive to correction of the deviation from a value within said larger range to a value entirely within said relatively small range, to render said first means ineffective on said restoring means; whereby the restoring means is inactive while the deviation is decreasing through said relatively small range toward said pre-selected position.

2. Apparatus for stabilizing the position of a flying body by selectively operable position restoring means controlled by on-off signals, comprising, in combination, a YES-NO gate; first means operable, responsive to a deviation of the body through a relatively small range from a pre-selected position, to trigger said gate to a signal passing condition and to supply an "on" signal to the restoring means through said gate; and second means operable, responsive only to a deviation of the body through a relatively large range, outside said relatively small range, to deliver an "on" signal to the restoring means and bypassing said gate; said second means, responsive to the correction of the deviation from a value within said relatively large range to a value entirely within said small range, triggering said gate to a signal blocking condition to render said first means ineffective to deliver an "on" signal through said gate; whereby the restoring means is inactive while the deviation is decreasing through said relatively small range toward said pre-selected position.

3. Apparatus for stabilizing the position of a flying body by selectively operable position restoring means activated by restoring signals, comprising, in combination, first signal generating means operable, responsive to a deviation of the body through a relatively small range from a pre-selected position, to deliver a first control signal; second signal generating means operable, responsive only to a deviation of the body through a relatively large range outside said relatively small range, to deliver a second control signal; a first amplifier having its input connected to said first signal generator and operable, responsive to receipt of a first signal, to deliver a restoring signal to the position restoring means; a second amplifier having its input connected to said second signal generator and operable, responsive to receipt of the second control signal, to deliver a restoring signal to the position restoring means; and means operable by said second amplifier, upon termination of receipt of a second control signal at its input, to block delivery of a restoring signal from said first amplifier to the position restoring means; whereby the restoring means is inactive while the deviation is decreasing through said relatively small range toward said pre-selected position.

4. Apparatus for stabilizing the position of a flying body, as claimed in claim 3, in which said last-named means comprises a YES-NO gate connected in the output of said first amplifier and triggered to a signal passing condition by differentiation of the leading flank of the restoring signal from said first amplifier; said gate being triggered to the signal blocking condition by the trailing flank of the restoring signal delivered from said second amplifier.

5. Apparatus for stabilizing the position of a flying body by selectively operable position restoring means activated by restoring signals, comprising, in combination, a first signal generator operable, responsive to deviation of the body through a relatively small range from a preselected position, to deliver a first control signal; a second signal generator operable, responsive only to deviation of the body through a relatively larger range outside of said relatively smaller range, to deliver a second control signal; a first amplifier having its input connected to said first sig nal generator and effective to deliver a first restoring signal responsive to receipt of a first control signal; a second amplifier having its input connected to said second signal generator and effective to deliver a second restoring signal responsive to receipt of a second control signal; a gate connected between the output of said first amplifier and the position restoring means; means connecting the output of said second amplifier directly to the position restoring means; a first differentiating means connected to the output of said first amplifier to differentiate the leading flank of said first restoring signal; a second differentiating means connected to the output of said second amplifier to differentiate the trailing flank of said second restoring signal; means operable, responsive to differentiation of the leading flank of said first restoring signal, to condition said gate to pass said first restoring signal to the restoring means; and means operable, responsive to differentiation of the trailing flank of said second restoring signal, to condition said gate to block passage of said first restoring signal; whereby said first signal generator is effective to activate the restoring means only when the deviation does not progress beyond said relatively small range, and is ineffective to activate the restoring means when the deviation progresses beyond said small range into said relatively larger range and when the correction proceeds from a value within said larger range to a value entirely within said relatively small range.

6. Apparatus for stabilizing the position of a flying body, as claimed in claim 5, in which said last-named means comprises a bi-stable multi-vibrator connected to said gate and to said differentiating means; and a reversing stage connected between said first differentiating means and said bi-stable multi-vibrator; whereby said bi-stable multi-vibrator is flipped from a normal state to a reverse state responsive to differentiation of the leading flank of said first restoring signal, and is flipped to the normal state responsive to differentiation of the trailing flank of said second restoring signal as the value of the deviation proceeds from such larger range into such smaller range.

7. Apparatus for stabilizing the position of a flying body by selectively operable restoring means activated by on-off signals, comprising, in combination, a first signal generator operable, responsive to deviation of the body through a relatively smaller range from a pre-selected position, to develop a first control signal; a second signal generator operable, responsive only to deviation of the body through a relatively larger range outside of said relatively small range, to develop a second control signal; first and second amplifier-discriminators having inputs connected to said first and second signal generators, respectively, and arranged to deliver output restoring signals responsive to receipt of input control signals from the associated signal generator; a YES-NO gate connected between the output of said first amplifier-discriminator and the positon restoring means; means connecting the output of said second amplifier-discriminator directly to the positon restoring means; a bi-stable multi-vibrator connected to said gate and having a normal state in which said gate is blocked; a first differentiating means and a reversing stage connected, in series, between the output of said first amplifier-discriminator and said bi-stable multi-vibrator; and a second differentiating means connected between the output of said second amplifier-discriminator and said bi-stable multi-vibrator; differentiation and reversal of the leading flank of the restoring signal from said first amplifier-discriminator triggering said bi-stable multi-vibrator to a reversed state conditioning said gate for passage of said last-named restoring signal to the position restoring means; and differentiation of the trailing flank of the restoring signal from said second amplifier-discriminator restoring said bi-stable multi-vibrator to such normal state to block said gate.

8. Apparatus for stabilizing the position of a flying body, as claimed in claim 7, including a first diode connected between said reversal stage and said bi-stable multi-vibrator; and a second diode connected between said second differentiation means and said bi-stable multi-vibrator.

9. Apparatus for stabilizing the position of a flying body, as claimed in claim 7, in which said signal generator is comprised of photo elements; and optical means effective to direct light rays upon said photo elements in accordance with the deviation of the body from a pre-selected position.

10. Apparatus for stabilizing the position of a flying body, as claimed in claim 9, in which, in the pre-selected position of the body, said optical means is ineffective to direct light rays upon said photo elements.

11. A method of stabilizing the position of a flying body by selectively operable position restoring means comprising the steps of measuring deviations of the body from a pre-selected position; in response to deviation of the body from such pre-selected position through a relatively small range, actuating said position restoring means responsive to such small deviation; in response only to deviation of the body through a relatively larger range outside said relatively small range, actuating said position restoring means responsive to such larger deviation; and, when the deviation has progressed into such relatively larger range, deactivating the position restoring means when the deviation returns to and passes through such relatively small range.

12. A method for stabilizing the position of a flying body with respect to a luminous celestial body, by operation of position restoring means, comprising the steps of measuring the deviation of the flying body from a pre-selected position; in response to deviation of the body through a relatively small range from such pre-selected position, providing a first control signal to the position restoring means; in response only to the deviation of the body through a relatively larger range outside of said relatively small range, providing a second control signal to the restoring means; and, responsive to re-adjustment of the position of the body to a deviated position within said small range, rendering ineffective the first control signal.

References Cited

UNITED STATES PATENTS

| | | | |
|---|---|---|---|
| 2,604,601 | 7/1952 | Menzel | 250—203 X |
| 3,161,375 | 12/1964 | Ruhge | 250—203 X |

FOREIGN PATENTS 958,210  2/1957  Germany.

RODNEY D. BENNETT, *Primary Examiner.*

MALCOLM F. HUBLER, *Assistant Examiner.*